Feb. 1, 1966  E. B. FERNBERG  3,232,161
BLIND FASTENERS

Original Filed Aug. 21, 1962  2 Sheets-Sheet 1

INVENTOR
ERIC BIRGER FERNBERG

BY *Malcolm W. Fraser*
ATTORNEY

INVENTOR
ERIC BIRGER FERNBERG

United States Patent Office 3,232,161
Patented Feb. 1, 1966

3,232,161
BLIND FASTENERS
Eric Birger Fernberg, Wavendon, near Bletchley, England, assignor to F.T. Products Limited, London, England, a British company
Continuation of application Ser. No. 218,287, Aug. 21, 1962. This application Apr. 21, 1965, Ser. No. 451,688
Claims priority, application Great Britain, Aug. 22, 1961, 30,319/61
4 Claims. (Cl. 85—72)

This invention is a continuation of application Serial No. 218,287 filed August 21, 1962 and which is now abandoned.

The present invention relates to a fastener in the form of a rivet of a moldable material which is particularly, although not exclusively, suitable for securing a member such as beading to a panel.

In the car manufacturing industry it is frequently necessary to secure a member such as strip beading or cable to the flat surface of a vehicle body panel.

In order to do this an aperture is drilled in the panel and a snap engaging fastener, provided with means for engaging the member to be secured, is engaged in the aperture in the panel.

Hitherto such fasteners have been formed from resilient metal and have had the disadvantage that, if they are sufficiently rigid to engage securely in the aperture, they are difficult to assemble and, when assembled they do not effect a water-tight closure of the aperture.

The present invention provides a fastener which functions in the manner of a rivet and is designed to overcome the disadvantages inherent in metal fasteners of the above-described kind, which is quick and easy to assemble, holds secure and effects a water-tight closure of the aperture when assembled and which is furthermore cheap to manufacture.

According to the invention there is provided a fastener formed from a moldable material and adapted for use in the manner of a blind rivet, having a head and a hollow tubular stud extending from the underside of the head, a bore extending into the top of the head and a plunger extending through the bore and projecting from the top of the head, the plunger being joined to the head adjacent the stud along a line of weakness whereby, upon depression into the head the plunger shears at the said line of weakness and enters the stud which is thereby expanded outwardly.

According to a further aspect of the invention there is provided a fastener formed from a moldable material and adapted for use in the manner of a blind rivet, having a head and a hollow tubular stud extending from the underside of the head, a bore extending into the top of the head and a plunger extending through the bore and projecting from the top of the head, the plunger being joined to that part of the stud adjacent the head along a line of weakness and the inner surface of the said hollow, tubular stud being convex on any radial section therethrough whereby, upon depression into the head the plunger shears at the said line of weakness and enters the stud which is thereby expanded outwardly.

Preferred forms of the invention will now be described with reference to the accompanying drawings, in which:

FIGS. 1, 2, and 3 are respectively a side elevation, plan, and underplan of a fastener;

In FIGS. 1 to 5 a fastener is indicated generally at 10. The fastener 10 is formed from a moldable material such as synthetic plastic, for instance, that sold under the trade name Delrin, and comprises a head 11, a hollow tubular stud 12 and a plunger 13.

Figure 5:
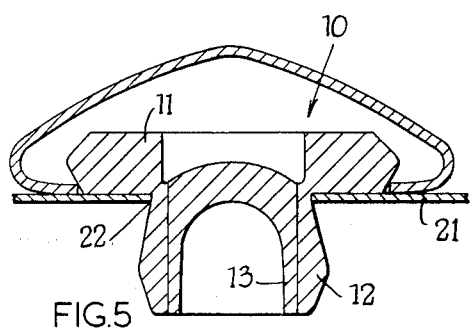
FIG. 5 is similar to FIG. 4 showing the fastener secured in the aperture and engaging a strip beading to the panel.

The head 11 is designed for engaging a beading to a panel, as shown in FIG. 5 and for this purpose is provided with surfaces 14 and 15 sloping respectively downwardly and upwardly away from a periphery or rim 16.

The stud 12 is open ended and the inner surface of its wall is shaped so as to be convex with the internal transverse cross-sectional area of the stud decreasing smoothly, as at 17a, from the head 11 up to a minimum at a point 17 which lies intermediate its length.

The plunger 13 which is also hollow and tubular in shape is joined at its base to the head 11 by four connecting ribs 18 and thus extends through, and projects from a bore 19 formed in the top side of the head 11.

The fastener 10 is designed to function in the manner of a rivet which can be upset by depressing the plunger so as to shear the ribs 18 and force the plunger down into the stud 12 which is thereby expanded outwardly.

The ribs 18 constitute a line of weakness and will break easily to allow the plunger to enter the stud, while the convex shape of the internal surface of the wall of the stud ensures that the wall is expanded outwardly by the plunger 13.

Figure 1:
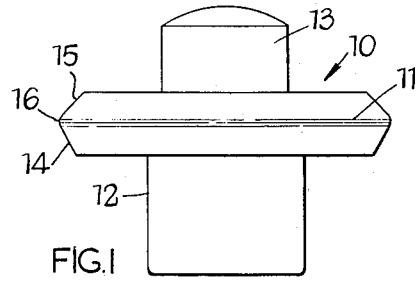
Figure 2:
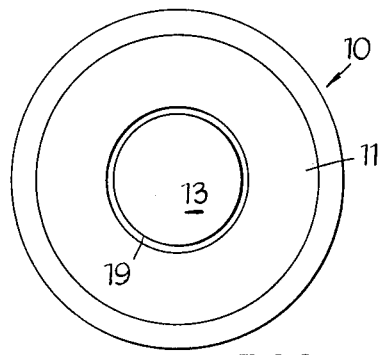
Figure 3:
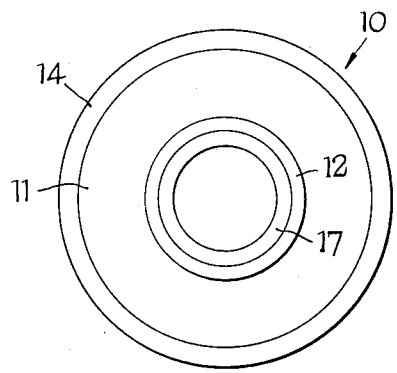
Figure 4:
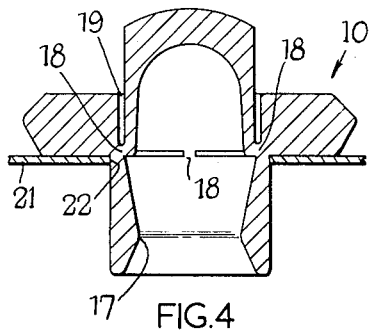
FIG. 4 is a sectional side elevation of the fastener of FIGS. 1 to 3 seated in an aperture in a panel.

In FIGS. 5 the fastener 10 is shown securing a strip beading 20 to a panel 21. The panel 21 is formed with a circular aperture 22 and in order to make the assembly, the fastener 10 is seated in the aperture as shown in FIG. 4. The plunger is then struck so as to break away from the head and enter the stud 12. As the plunger enters the stud the wall thereof is expanded outwardly into the position shown in FIG. 5 so that the fastener 10 is securely held within the aperture 222 and effects a water-tight closure of the aperture.

When the fastener is in position the beading 20 is then snapped or slid over the head 11 in any convenient manner. In practice the panel 21 is formed with a plurality of aligned apertures, a fastener is engaged in each one of the apertures and the beading is then engaged over the row of fasteners.

The diameter of the bore 19 in the fastener 10 should be such that the gap between the wall of the bore and the plunger 13 is at a minimum. The bore 19 then acts as a guide for the plunger and prevents it from canting when struck down into the stud.

The point of minimum internal cross-section 17 of the stud 12 is preferably positioned adjacent the open end of the stud so that, as the plunger enters the stud, the frictional resistance offered by the stud increases gradually and smoothly. This makes it easier to depress the plunger and lessens the distortion imparted to the wall of the stud.

Figure 6:
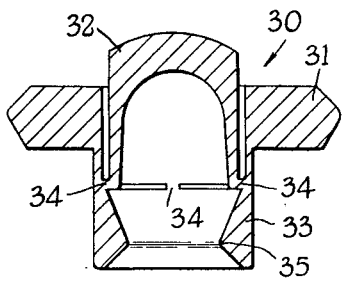
FIG. 6 is a sectional side elevation of a modification of the fastener of FIGS. 1 to 3.

It may be desired to lengthen the bore in the head so as to provide a guide over a greater part of the length of the plunger, as shown in FIG. 6.

In FIG. 6 there is shown a fastener 30 which is formed with a head 31, an integral plunger 32 and a stud 33, and which is similar to the fastener 10 except that the integral plunger 32 is joined, along a line of weakness, to the stud 33 by four connecting ribs 34 instead of to the head. The internal wall of the stud 33 is shaped, as at 35, so as to be convex, similarly to the stud 12.

The fastener 30 is used in the same manner as the fastener 10 in the assembly described with reference to FIGS. 4 and 5. It has the advantages over the fastener 10 that, the integral plunger 32, being joined to the stud 33 instead of the head 31, is less likely to cant sideways when depressed because the bore in the head provides a guide over almost the whole of its length, and before assembly, it does not project so far above the head 31 and consequently does not have to be forced so far down into the stud 33.

Figure 7:
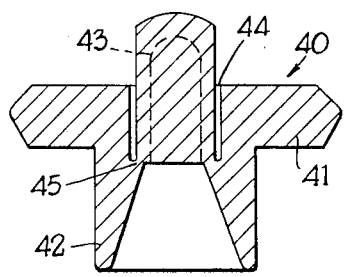
FIG 7 is a sectional side elevation of a further modification of the fastener of FIGS. 1 to 3.

A further modification of the fastener 10 is indicated generally at 40 in FIG. 7.

The fastener 40 is formed with a head 41, a stud 42 and a cylindrical plunger 43. The stud 42 is formed with a bore 44 and the plunger 43 passes through the head 41 and is joined to the nose at a line of weakness 45. To save material the plunger 43 may be hollow, as shown in broken lines.

The fastener 40 is used in the same manner as the fastener 10 in the assembly described with reference to FIGS. 4 and 5. When the plunger 43 is depressed it breaks away from the stud 42 at the line of weakness 45 and as it enters the bore 44 forces the wall of the stud outwardly so that the fastener cannot be withdrawn from the aperture.

Figure 8:
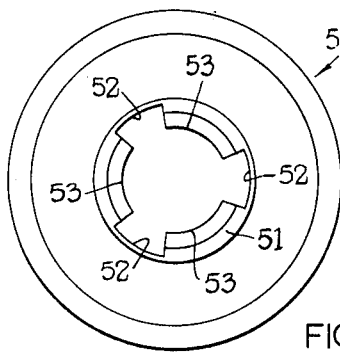
FIG. 8 is an underplan of yet a further modification of the fastener of FIGS. 1 to 3.

Yet a further modification of the invention is indicated generally at 50 in FIG. 8.

The fastener 50 is similar to the fastener 10 except that a stud 51 is formed with a straight sided internal wall having lines of weakness in the form of grooves 52 each of which extends longitudinally over a major length of the stud.

During assembly a plunger, not shown in the figure is forced down into the stud 51, in the manner described above with reference to the fastener 10, and the diameter of the plunger is such that the stud 51 is split along the lines of weakness 52 so as to constitute three separate tongues 53.

Figure 9:
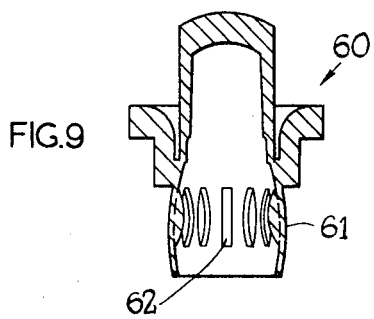
FIG. 9 is a sectional elevation of a still further modification of the invention.

In a still further modification of the invention, indicated generally at 60 in FIG. 9, a stud 61 of a fastener 60, is formed internally with a plurality of equiangularly spaced protuberances in the form of ribs 62.

The ribs 62, which extend longitudinally of the stud 61, provide the interference for the plunger as it is depressed thus ensuring that the stud is expanded outwardly.

The head of the fastener according to the invention may be shaped to serve any particular purpose for which it is designed.

For instance, if the fastener according to the invention is designed to secure a beading to a panel the head may be shaped as shown in FIGS. 1 to 4 or alternately as shown in FIG. 9. If, however, the fastener is designed to hold a cable to a panel then the head may be provided with suitable cable holding means. Alternately, if the fastener is designed to secure two flat apertured members together the length of the stud may be extended and the fastener used in the manner of a conventional rivet.

It will be seen that a fastener according to the invention may also be formed so as to have a stud formed with a wall having a straight internal surface and a plunger formed with a circumferential protuberance which provides the necessary interference to expand the wall of the stud outwardly when the plunger is depressed.

What is claimed:

1. A fastener formed from a moldable material and adapted for use in the manner of a rivet, having a head, a hollow tubular shank extending from one side of the head, a bore in said head and a plunger extending into said bore, said bore being of uniform diameter throughout its length and extending at least from the junction of said head and said shank to the outer extremity of said head, said plunger being of greater length than said bore whereby the outer end thereof projects from the top surface of said head, said plunger being of substantially uniform external dimension throughout its length, said plunger having its inner end integrally secured within said bore at the innermost portion of said bore by a plurality of frangible connecting ribs, said shank being circumferentially continuous throughout its length, substantially cylindrical in external configuration and having an internal wall which is convergent inwardly from said innermost portion of said bore to provide a radially, inwardly extending shoulder intermediate its length, said plunger being of greater width than the opening defined by said shoulder, whereby upon axial depression of said plunger said shank portion is expanded outwardly.

2. A fastener according to claim 1 wherein said plunger is secured to said head by a shearable web adjacent one end thereof.

3. A fastener formed from a moldable material adapted for use in the manner of a rivet, having a head, a hollow tubular shank extending from one side of the head, a recess in said head, and a plunger extending into said recess, said recess being of uniform diameter throughout its length, said plunger being of greater length than said recess whereby the outer end thereof projects from the top surface of said head, said plunger being of substantially uniform external dimension throughout its length, said plunger having its inner end integrally secured within said recess at the innermost portion of said recess by a plurality of frangible connecting webs, said shank being circumferentially continuous throughout its length, substantially longitudinally parabolic in external and internal configuration and having a plurality of spaced internal longitudinal ribs convergent radially inwardly from adjacent the junction of said head and said shank and then divergent in an axial direction, said plunger being of greater width than the opening defined by said rib at their points of maximum convergence, whereby upon axial depression of said plunger said shank portion is expanded outwardly.

4. A fastener according to claim 3 wherein said plunger is hollow and open at its end secured within said recess.

References Cited by the Examiner

UNITED STATES PATENTS

| | | | |
|---|---|---|---|
| 1,182,015 | 5/1916 | Kennedy | 85—72 |
| 2,150,080 | 3/1939 | Rawlings | 85—83 |
| 2,326,855 | 8/1943 | Hathorn | 85—82 |
| 2,402,287 | 6/1946 | Kearns | 85—72 |
| 2,657,894 | 11/1953 | Sklenar | 85—72 |
| 2,887,694 | 5/1959 | Sauter | 85—72 |
| 2,921,819 | 1/1960 | Rifkin | 85—72 |
| 2,941,439 | 6/1960 | Rapata | 85—72 |
| 3,030,850 | 4/1962 | Minor et al. | 85—82 |
| 3,065,004 | 11/1962 | Laich | 85—82 |
| 3,065,661 | 11/1962 | Kolec et al. | 85—72 |
| 3,078,064 | 2/1963 | Turnbull | 85—84 |
| 3,105,407 | 10/1963 | Rapata | 85—72 |

FOREIGN PATENTS 1,156,476  12/1957  France.

CARL W. TOMLIN, Primary Examiner.